US008668091B2

(12) United States Patent
Makino et al.

(10) Patent No.: US 8,668,091 B2
(45) Date of Patent: Mar. 11, 2014

(54) AIR CLASSIFIER

(75) Inventors: Nobuyasu Makino, Numazu (JP); Eiichi Masushio, Shizuoka (JP); Fumitoshi Murakami, Fuji (JP)

(73) Assignee: Ricoh Company, Ltd., Tokyo (JP)

( * ) Notice: Subject to any disclaimer, the term of this patent is extended or adjusted under 35 U.S.C. 154(b) by 533 days.

(21) Appl. No.: 12/368,637

(22) Filed: Feb. 10, 2009

(65) Prior Publication Data

US 2009/0206008 A1 Aug. 20, 2009

(30) Foreign Application Priority Data

Feb. 15, 2008 (JP) ................................. 2008-034592

(51) Int. Cl.
*B01D 21/30* (2006.01)

(52) U.S. Cl.
USPC ..... 209/152; 209/138; 209/139.1; 209/139.2; 209/710; 209/717

(58) Field of Classification Search
USPC ........... 209/138, 139.1, 139.2, 143, 710, 717, 209/718, 722, 154
See application file for complete search history.

(56) References Cited

U.S. PATENT DOCUMENTS 4,221,655 A 9/1980 Nakayama et al.
5,016,823 A * 5/1991 Kato et al. ......................... 241/5
5,165,549 A * 11/1992 Kanda et al. .................. 209/135
5,168,536 A * 12/1992 Kucherov et al. ............... 385/78
6,269,955 B1 * 8/2001 Morimoto et al. ............ 209/723
6,368,765 B2 4/2002 Izu et al.
6,503,681 B2 1/2003 Makino et al.
6,568,536 B2 * 5/2003 Tanaka et al. .............. 209/139.2
7,032,849 B2 * 4/2006 Takahashi et al. .............. 241/39
7,156,331 B2 1/2007 Takahashi et al.
7,318,990 B2 1/2008 Makino et al.
8,172,087 B2 * 5/2012 Fryars ........................... 209/138

(Continued)

FOREIGN PATENT DOCUMENTS

DE 39 43 733 C2 11/1990
GB 2 105 223 A 3/1983

(Continued)

OTHER PUBLICATIONS

Office Action issued Aug. 30, 2011, in Japanese Patent Application No. 2008-034592 (with partial English-language translation).

*Primary Examiner* — Stefanos Karmis
*Assistant Examiner* — Michael E Butler
(74) *Attorney, Agent, or Firm* — Oblon, Spivak, McClelland, Maier & Neustadt, L.L.P.

(57) ABSTRACT

An air classifier contains a cylindrical casing provided with at an upper part thereof a feed port to feed high pressure air and a powder material, an umbrella-shaped center core in the casing, and an umbrella-shaped separator core arranged downstream of the center core in the casing and including an opening at center thereof. The air classifier has a configuration containing a dispersion chamber to disperse the powder material, being surrounded by an inner wall of the upper part casing and the center core, and a classification chamber to classify the powder material into fine and coarse powders by centrifugation, being surrounded by the center core, separator core and inner wall of the casing. In the dispersion chamber provided are a louver ring containing guide slats circularly arranged at regular intervals, and a space encircling the louver ring and serving as flow passage of the air and powder material.

16 Claims, 9 Drawing Sheets

(56) References Cited

U.S. PATENT DOCUMENTS

| | | | | |
|---|---|---|---|---|
| 8,312,994 | B2 * | 11/2012 | Schneider et al. | 209/139.1 |
| 8,343,360 | B2 * | 1/2013 | Schook | 210/788 |
| 8,469,297 | B2 * | 6/2013 | Makino | 241/101.5 |
| 2002/0021987 | A1 * | 2/2002 | Tanaka et al. | 422/101 |
| 2003/0178514 | A1 | 9/2003 | Makino et al. | |
| 2004/0253531 | A1 * | 12/2004 | Ota et al. | 430/137.2 |
| 2005/0003294 | A1 | 1/2005 | Murakami et al. | |
| 2005/0112492 | A1 | 5/2005 | Makino et al. | |
| 2006/0032952 | A1 | 2/2006 | Kawamoto et al. | |
| 2006/0063091 | A1 * | 3/2006 | Makino et al. | 430/110.4 |
| 2006/0214036 | A1 * | 9/2006 | Makino | 241/5 |
| 2006/0222980 | A1 * | 10/2006 | Makino et al. | 430/105 |
| 2007/0031754 | A1 | 2/2007 | Murakami et al. | |
| 2008/0227022 | A1 | 9/2008 | Noge et al. | |

FOREIGN PATENT DOCUMENTS

| | | | |
|---|---|---|---|
| JP | 46-8984 | | 3/1971 |
| JP | 54-81172 | U | 11/1977 |
| JP | 3-1098 | | 1/1991 |
| JP | 3-102282 | U | 10/1991 |
| JP | 6-121940 | | 5/1994 |
| JP | 2766790 | | 4/1998 |
| JP | 11-138103 | | 5/1999 |
| JP | 2000-189897 | | 7/2000 |
| JP | 3493489 | | 11/2003 |
| JP | 3517692 | | 2/2004 |
| JP | 3531784 | | 3/2004 |
| JP | 3731077 | | 10/2005 |
| JP | 3752068 | | 12/2005 |
| JP | 3752096 | | 12/2005 |
| JP | 2006-289349 | | 10/2006 |

* cited by examiner

AIR CLASSIFIER

BACKGROUND OF THE INVENTION

1. Field of the Invention

The present invention relates to an air classifier that can effectively produce toner powder and other powder materials with sharp particle size distribution by preventing contamination with fine powder and coarse particles.

2. Description of the Related Art

Several traditional approaches are known for classifying (or sorting) pulverized coarse toner particles: a combination of a single classifier BZ1 and a single pulverizer FZ1 as shown in FIG. 1; a combination of two classifiers BZ1 and BZ2 and a single pulverizer FZ1 as shown in FIG. 2; and a combination of two classifiers BZ1 and BZ2 and two pulverizers FZ1 and FZ2 as shown in FIG. 3. One type of the pulverizers used in these systems is a jet pulverizer that propels raw material particles in a high pressure air stream spouted from a jet nozzle to cause the particles to collide with each other or hit a wall or other objects and thus crush (or pulverize) the particles. One example of such pulverizers is I-type mill pulverizer manufactured by Nippon Pneumatic Mfg. Co., Ltd.

An exemplary system is now described with reference to FIG. 3.

Raw materials are fed through a feed pipe FE1, and together with a previously pulverized product and high pressure air, introduced into a first classifier BZ1 where they are classified into a coarse powder and a fine powder. The coarse powder is pulverized in a first pulverizer FZ1 via a pulverizing unit and collected in a cyclone CY1. The collected powder is introduced into a second classifier BZ2 where it is again classified into a coarse powder and a fine powder. The separated coarse powder is then pulverized in a second pulverizer FZ2 via a pulverizing unit and collected in a cyclone CY2. The collected powder is sent to a fine powder-classifying unit where it is classified into a fine powder and a final product. In this system, however, the powder fed to the classifying unit contains toner particles of various sizes that are in the process of pulverization and are circulating between the pulverizing unit and classifying unit, as well as the raw material powder.

In FIGS. 1 though 3, BF1 and BF2 each indicate a bag filter, BL1 and BL2 each indicate a blower, and FE2 indicates a feed pipe.

FIG. 4 shows a construction of an air classifier (a DS air classifier) that is used as BZ1 and BZ2 in the above-described system. The air classifier includes a dispersion chamber (or collector dispersion chamber) 1, a classification chamber 2 and a bottom hopper 3 that are arranged from the top down. The dispersion chamber 1 is defined by a cylindrical casing 10 that has a dispersion chamber inlet 1*a* connected at the upper periphery thereof for feeding a primary air stream and powder materials to the dispersion chamber 1. Arranged within the dispersion chamber 1 near its bottom is an umbrella-shaped center core 5 with a raised center portion. A similarly umbrella-shaped separator core 8 with a raised center portion is arranged below the center core 5. A slatted secondary air stream inlet 9 (also referred to as "louver") is arranged about the classification chamber 2 along the outer periphery of the classification chamber 2 to facilitate dispersion of the powder materials and accelerate the swirling of the powder materials. In this manner, the fine powder within the classification chamber 2 is guided to a fine powder discharge port 7 provided in the separator core 8 and discharged through a pipe 13 connected to the fine powder discharge port 7 by the suction force provided by the blower. On the other hand, the coarse powder is discharged from an annular discharge port 6 provided along the outer periphery of the lower edge of the separator core 8.

A typical DS air classifier operates by the principle that centrifugal and centripetal forces of different magnitudes act on the coarse particles and fine particles present in a powder material as the secondary air stream flows into the classification chamber and causes a non-free flow of the swirling particles. For this reason, it is desirable that the particles dispersed in the classification chamber be quickly classified into coarse particles and fine particles without allowing the particles to re-aggregate together.

However, conventional DS air classifiers are now required to disperse an increased number of toner particles because toner particles are becoming increasingly small and pulverization performance of pulverizers has improved significantly. When used to disperse such increased number of particles, the dispersion performance of conventional DS air classifiers will decrease, resulting in decreased classification accuracy. This inevitably leads to an increase in the amount of ultra-fine powder caused by excessive pulverization and coarse particles contaminating the fine powder discharge unit. As a result, the product obtained by the classification process may cause smears and improper transfer and may therefore lead to decreased image quality. The increased amount of ultra-fine powder and the contamination of the fine powder discharge unit with coarse particles may also pose an excessive load on the classifier during the production process and may thus decrease the efficiency of classification as well as the energy efficiency of pulverization.

Japanese Patent No. 2766790 discloses a classifier in which a louver is provided in the dispersion chamber (collector). In this classifier, a nozzle is inserted in the louver for introducing powder and primary air. Secondary air is introduced from the outer periphery of the louver to facilitate the dispersion of the powder. This construction is disadvantageous in that when raw materials are fed with high pressure air, the pressure difference within the dispersion chamber causes the raw materials to be released from the collector into the atmosphere, making it difficult to further continue the classification process.

BRIEF SUMMARY OF THE INVENTION

The present invention has been devised to address the above-described problems, and it thus is an object of the present invention to provide an air classifier that can not only readily prevent generation of excessive fine powder and contamination with coarse powder, but can also enable effective recycling of excessive fine powder and is suitable for the production of dry toner and other powder materials in terms of power consumption efficiency.

Means for solving the above-described problems are as follow:

<1> An air classifier 100 containing: a cylindrical casing 10 provided with a powder material feed port 1*a* configured to feed high pressure air and a powder material at an upper part of the casing 10; an umbrella-shaped center core 5 arranged in the casing 10; and an umbrella-shaped separator core 8 arranged downstream of the center core 5 in the casing 10, the separator core including an opening 7 formed at a center thereof, wherein the air classifier 100 has a configuration including: a dispersion chamber 1 configured to disperse the powder material fed with the high pressure air, the dispersion chamber being surrounded by an inner wall of the upper part of the casing 10 and the center core 5; and a classification chamber 2 configured to classify the powder material flowing in from the dispersion chamber 1 into a fine powder and a coarse powder by centrifugation, the classification chamber 2 being surrounded by the center core 5, the separator core 8 and the inner wall of the casing 10, and wherein the air classifier 100 contains a louver ring 1Q including a plurality of guide slats 1*q* circularly arranged at regular intervals in the dispersion chamber 1, and the dispersion chamber 1 contains a space 1*b* which encircles the louver ring 1Q and serves as a flow passage of the high pressure air and powder material fed from the powder material feed port 1*a* (See FIGS. 5A and 5B).

<2> The air classifier according <1>, wherein a number N of the guide slats of the louver ring satisfies Formula 1:

$$R/10 \leq N \leq R/20 \qquad \text{Formula 1}$$

where R is a length (mm) of an inner periphery of the casing at the dispersion chamber.

<3> The air classifier according to <1>, wherein the center core 15 contains a fine powder discharge port 15*a* formed at a center thereof and a fine powder discharge pipe 15*b* connected to the fine powder discharge port 15*a* and extending from the fine powder discharge port 15*a* to the opening 7 of the separator core 8 (See FIG. 6).

<4> The air classifier according to <3>, wherein an upper surface of the center core 15 has an apex having an apex angle $\alpha$1 of 90° to 140° (see FIG. 7).

<5> The air classifier according to <3>, wherein the fine powder discharge port 15*a* of the center core 15 has an opening area A1, and the opening area A1 satisfies Formula 2:

$$1/10 \times A2 \leq A1 \leq 8/10 \times A2 \qquad \text{Formula 2}$$

where A2 is an opening area of the opening 7 of the separator core 8 (see FIGS. 8A, 8B, 9A and 9B).

<6> The air classifier according to <3>, wherein the fine powder discharge pipe 15*b* extends upward from an apex of the center core 15 (see FIG. 10).

<7> The air classifier according to <3>, wherein the fine powder discharge pipe 15*b* has a length L which satisfies Formula 3:

$$2 \times D2 \leq L \leq 8 \times D2 \qquad \text{Formula 3}$$

where D2 is a diameter of the opening 7 of the separator core 8 (see FIGS. 8A, 8B, 9A and 9B).

<8> The air classifier according to <1>, wherein the dispersion chamber contains a cylindrical anti-flow distortion part 14 arranged at a center of an upper lid of the casing (see FIGS. 11A and 11B).

<9> The air classifier according to <8>, wherein the anti-flow distortion part has a volume V1 which satisfies Formula 4:

$$3/10 \times V2 \leq V1 \leq 8/10 \times V2 \qquad \text{Formula 4}$$

wherein V2 is a volume of the dispersion chamber (see FIGS. 11A and 11B).

<10> The air classifier according to <8>, wherein the anti-flow distortion part has a bottom surface area VA1 which satisfies Formula 5:

$$2/10 \times VA2 \leq VA1 \leq 7/10 \times VA2 \qquad \text{Formula 5}$$

wherein VA2 is a cross-sectional area of the casing at the dispersion chamber, which is taken along a horizontal direction relative to a cylindrical diameter of the casing (see FIGS. 11A and 11B).

<11> The air classifier according to <1>, wherein the center core has a lower surface arranged parallel to an upper surface thereof.

<12> The air classifier according to <1>, wherein the casing has a blast-treated inner surface.

According to the present invention, the pulverized product or the raw material produced during the pulverization process to obtain desired particle size is drawn by high pressure air and flows into the dispersion chamber (collector) through the gaps formed in a louver arranged in the dispersion chamber. In this manner, not only can the generation of excessive fine powder and contamination with coarse powder be readily prevented, but effective recycling of excessive toner can also be achieved. In addition, the air classifier is suitable for the production of dry toner and other powder materials in terms of power consumption efficiency. The air classifier of the present invention further includes a fine powder discharge port and a fine powder discharge pipe arranged through the center core. The port and the pipe serve to facilitate the dispersion of the pulverized product or the raw material drawn into the dispersion chamber (collector) by high pressure air. As a result, the pulverized product or the raw material can disperse in the dispersion chamber more effectively than they can in conventional classifiers. Furthermore, the ultrafine powder produced during the pulverization can be collected in advance in the dispersion chamber (collector unit) to improve the accuracy of classification. The fine powder discharge port and the fine powder discharge pipe also serve to prevent excessive pulverization and reduce the amount of the coarse powder contaminating the fine powder (finished product). The toner produced by the air classifier of the present invention is of high quality since it has a sharp particle size distribution and can therefore store a constant amount of electrical charge. The toner can also ensure high, stable image quality without causing smears or improper transfer.

DETAILED DESCRIPTION OF THE INVENTION

Figure 1:
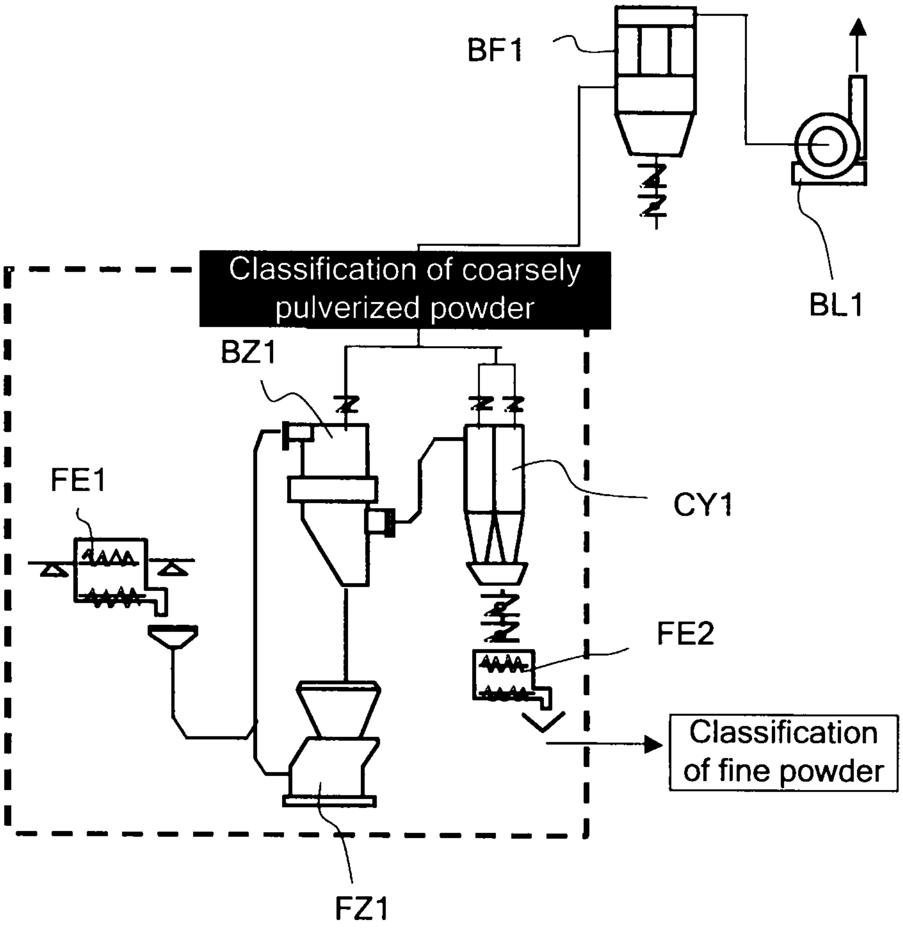
FIG. 1 is a system diagram showing the flow of classification of coarsely pulverized toner powder (1).
Figure 2:
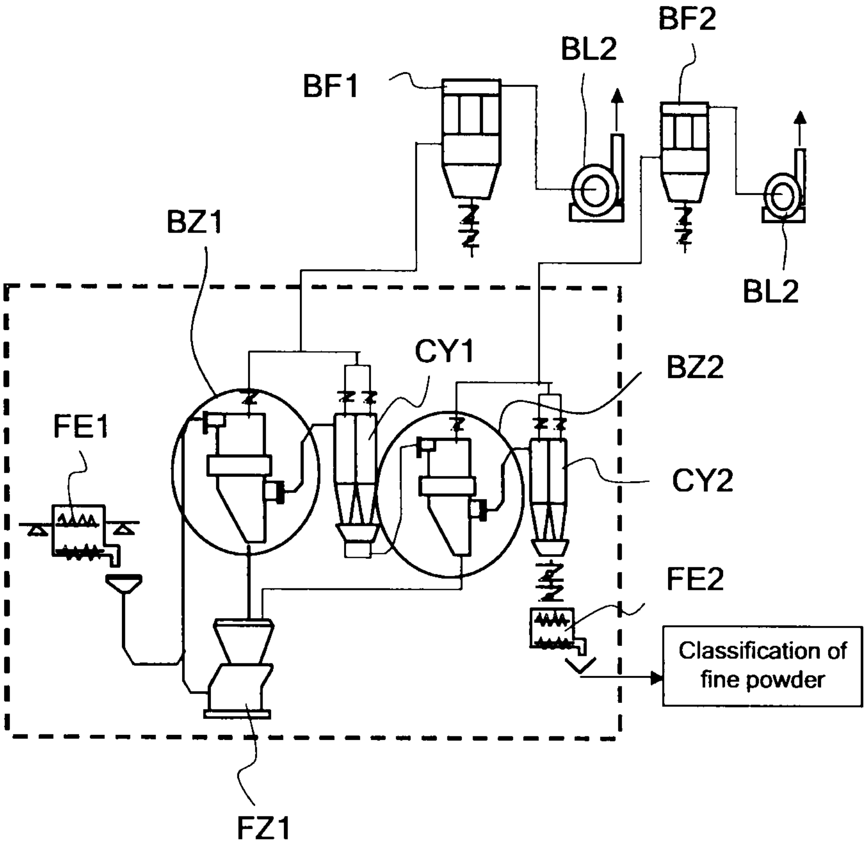
FIG. 2 is a system diagram showing the flow of classification of coarsely pulverized toner powder (2).
Figure 3:
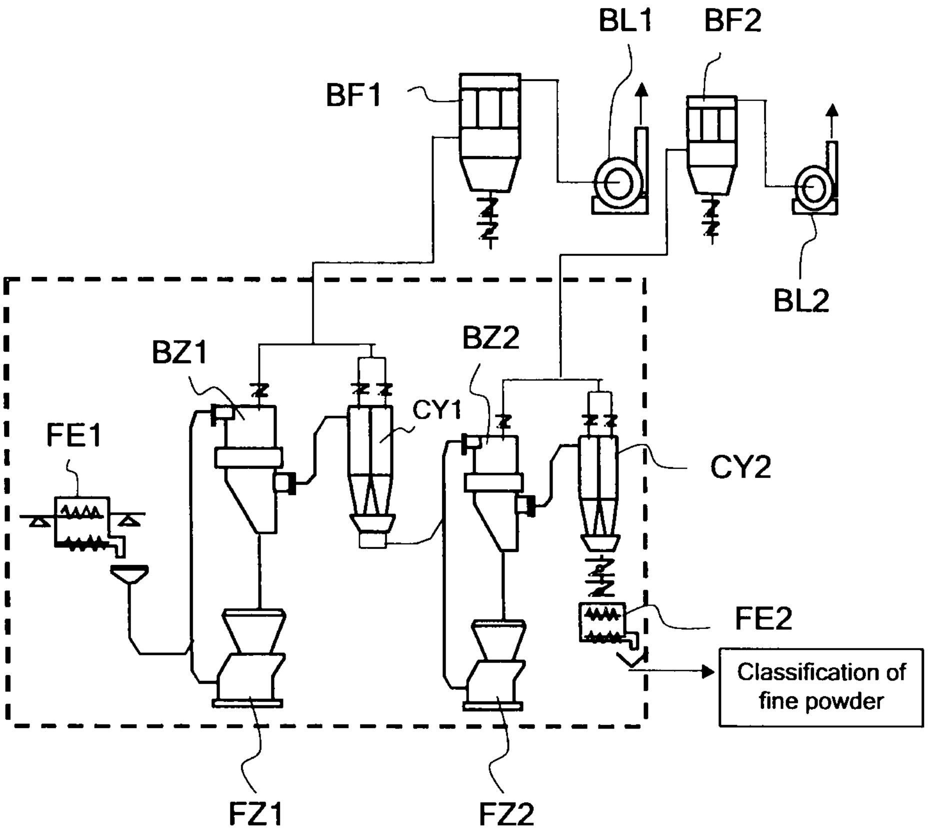
FIG. 3 is a system diagram showing the flow of classification of coarsely pulverized toner powder (3).

An air classifier of the present invention will now be described hereinafter. The air classifier of the present invention is used in the process of classify coarsely pulverized powder, as illustrated in FIGS. 1 to 3.

Figure 5A:
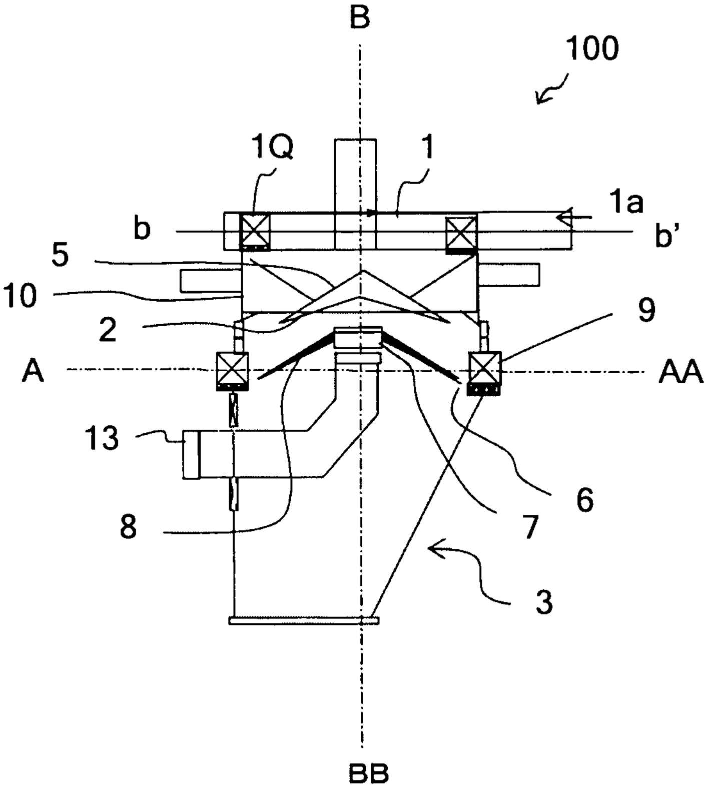
FIG. 5A is a schematic diagram of a first embodiment of air classifier of the present invention (1/2).
Figure 5B:
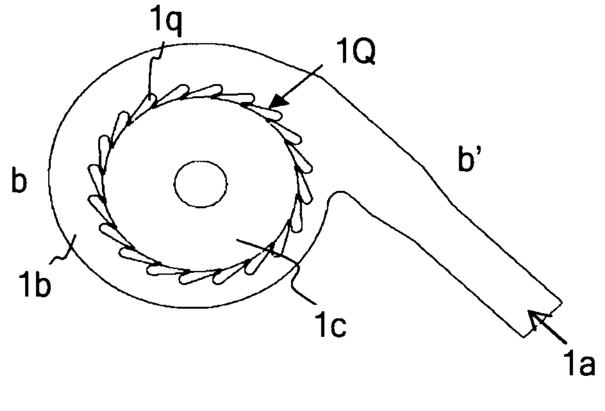
FIG. 5B is a schematic diagram of the first embodiment of air classifier of the present invention (2/2).

FIGS. 5A and 5B are schematic cross-sectional views, each showing a first embodiment of the air classifier of the present invention. FIG. 5A shows a longitudinal cross-sectional view of the air classifier, and FIG. 5B shows a cross-section taken along line b-b' in FIG. 5A.

As shown in FIG. 5A, the air classifier 100 includes a cylindrical casing 10 having at the upper part thereof a powder material feed port 1*a* configured to feed high pressure air and powder materials (i.e., powdery raw materials and pulverized product of the raw materials) to the air classifier 100. The air classifier 100 contains, in the casing 10, an umbrella-shaped upper center core 5 and an umbrella-shaped lower separator core 8 having a center opening 7. The air classifier 100 has a configuration which contains a dispersion chamber 1, a classification chamber 2, and a bottom hopper 3. The dispersion chamber 1 is surrounded by the inner wall of the upper part of the casing 10 and the center core 5 and is configured to disperse therein the powder materials fed with high pressure air, and the classification chamber 2 is surrounded by the center core 5, the separator core 8 and the inner wall of the casing 10 and is configured to classify the powder materials flowing in from the dispersion chamber 1 into a fine powder and a coarse powder by centrifugation.

According to the present invention, the dispersion chamber 1 accommodates a louver ring 1Q containing a plurality of guide slats 1*q* circularly arranged at regular intervals, and an space 1*b* encircling the louver ring 1Q to serve as a flow passage for the high pressure air and powder materials fed from the powder material feed port 1*a*. The guide slats 1*q* are preferably spaced apart from each other at a distance of 1 mm to 15 mm.

The louver ring 1Q arranged in the dispersion chamber 1 allows the high pressure air and powder materials (powder fluid) fed through the powder material feed port 1*a* to flow through the flow passage of the space 1*b* along the entire periphery of the louver ring 1Q. The louver ring 1Q also allows the powder fluid to flow through the gaps between the guide slats 1*q* of the louver ring 1Q into the interior 1*c* of the dispersion chamber 1. In this manner, the powder fluid can flow evenly from the outer periphery of the louver ring 1Q into the inside of the louver ring 1Q (or interior 1*c* of the dispersion chamber 1). This further facilitates the dispersion of the powder materials within the dispersion chamber 1.

The guide slats 1*q* of the louver ring 1Q are preferably provided in a predetermined number N that satisfies Formula 1 given below. By providing a predetermined number of the guide slats 1*q*, the dispersion of the powder fluid flowing through the louver ring 1Q into the dispersion chamber 1 can be further facilitated, resulting in improved classification performance.

$$R/10 \leq N \leq R/20 \qquad \text{Formula 1}$$

In Formula 1, R denotes the length (mm) of the inner periphery of the casing 10 at the dispersion chamber 1.

Figure 4:
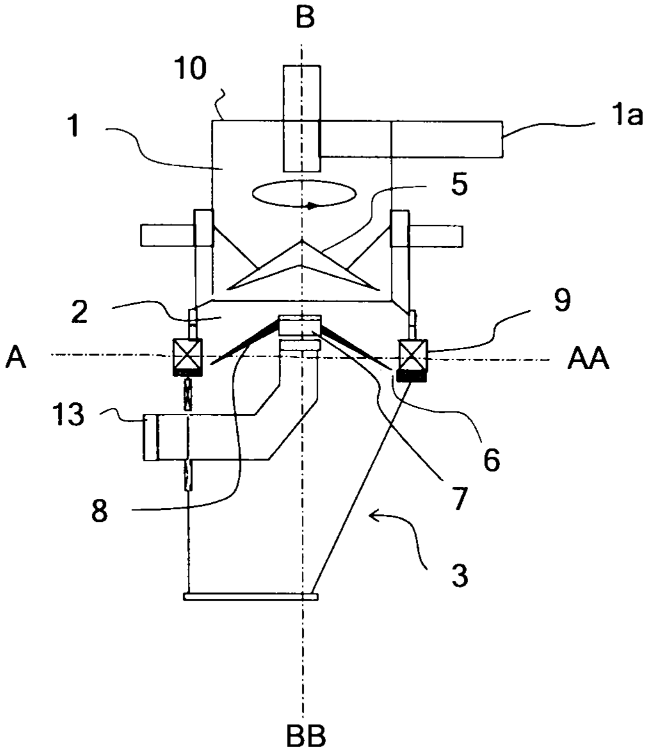
FIG. 4 is a cross-sectional view of a conventional air classifier.

In the similar manner to that of the air classifier illustrated in FIG. 4, a slatted secondary air stream inlet 9 (louver) is also arranged along the outer periphery of the classification chamber 2 so as to facilitate dispersion of the powder materials and accelerate the swirling of the powder materials. The second air stream inlet 9 is configured to serve as a flow passage to inlet the second air stream. Thus, the fine powder (particle diameter: 2 μm to 3 μm) within the classification chamber 2 is guided to a fine powder discharge port 7 provided in the separator core 8 and discharged through a pipe 13 connected to the fine powder discharge port 7 by the suction force provided by the blower. On the other hand, the coarse powder (particle diameter: 8 μm or greater) is discharged from an annular discharge port 6 provided along the outer periphery of the lower edge of the separator core 8.

A second embodiment of the air classifier of the present invention will now be described.

Figure 6:
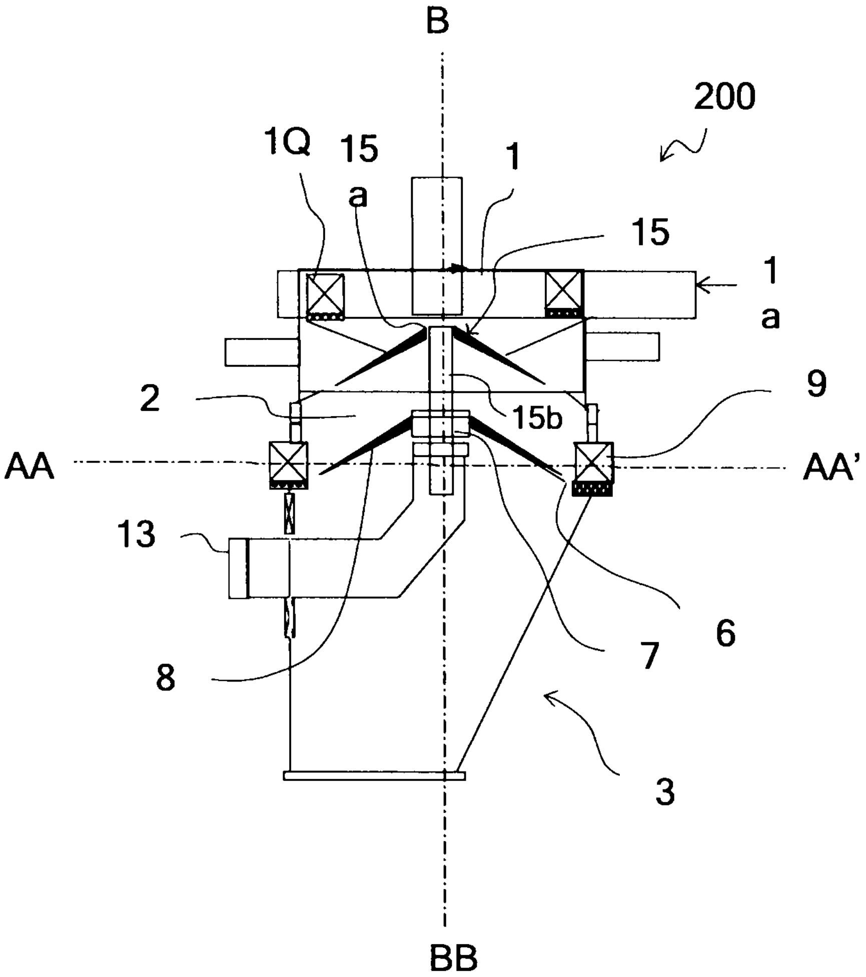
FIG. 6 is a schematic diagram of a second embodiment of air classifier of the present invention.

FIG. 6 is a cross-sectional view showing the second embodiment of the air classifier of the present invention.

An air classifier 200 has the same construction as the air classifier 100 shown in FIGS. 5A and 5B, except that the center core 5 has been replaced by a center core 15 having a fine powder discharge port 15*a* at the center thereof. The center core 15 also has a fine powder discharge pipe 15*b* connected thereto at the fine powder discharge port 15*a* and extending from the fine powder discharge port 15*a* to the opening 7 of the separator core 8. Other elements are the same as those used in the air classifier 100 and denoted by the same reference numerals.

In this construction, the powder product flows through the louver ring 1Q into the discharge chamber 1 where it forms a swirling flow. The suction force provided by the fine powder discharge pipe 15*b* causes this swirling flow to swirl at an even greater speed, thus further facilitating the dispersion of the powder product. Meanwhile, the facilitated dispersion allows the ultra-fine powder (particle diameter: 2 μm or less) in the powder fluid to be discharged through the fine powder discharge port 15*a* and the fine powder discharge pipe 15*b*, and further through the opening 7 of the separator core 8 and the pipe 13.

Figure 7:
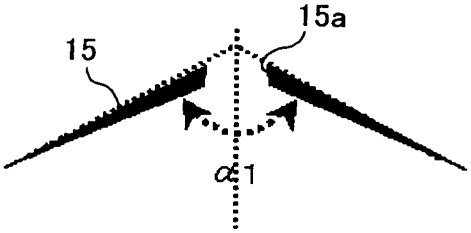
FIG. 7 is an illustrative view of the apex angle of a center core.

The apex angle $\alpha 1$ of the center core 15 is preferably in the range of 90° to 140°. When the apex angle $\alpha 1$ of the center core 15 is in the range of 90° to 140° ($90° \leq \alpha 1 \leq 140°$) as shown in FIG. 7, the internal volume of the dispersion chamber 1 can be adjusted to optimize the dispersion of the powder fluid for the desired degree of pulverization, so that the powder fluid can be readily sent to the lower classification chamber 2 without decreasing the speed of swirling.

Figure 8A:
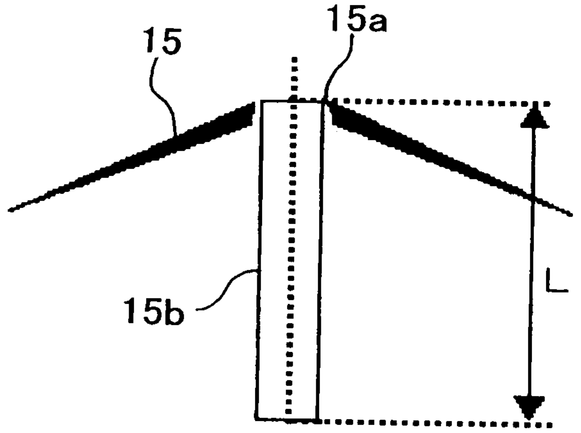
FIG. 8A is an illustrative view (side view) of a fine powder discharge port and a fine powder discharge pipe of the center core.
Figure 8B:
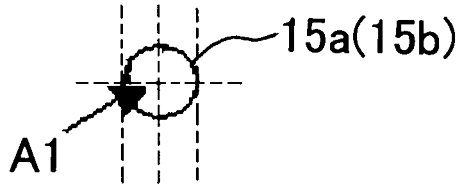
FIG. 8B is an illustrative view (top view) of the fine powder discharge port and the fine powder discharge pipe of the center core.
Figure 9A:
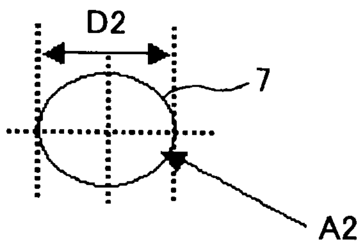
FIG. 9A is an illustrative view (top view) of an opening of a separator core.
Figure 9B:
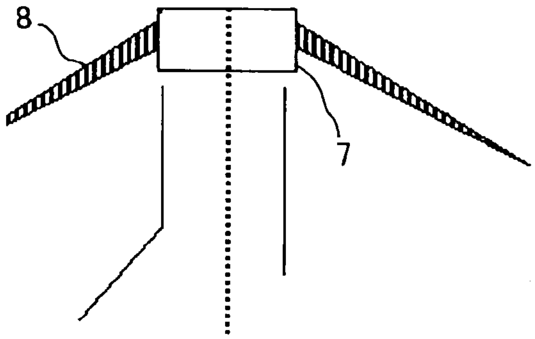
FIG. 9B is an illustrative view (side view) of the opening of the separator core.

The fine powder discharge port 15*a* of the center core 15 preferably has an opening area A1 that satisfies Formula 2 given below. By varying the opening area A1 of the fine powder discharge port 15*a* of the center core 15 (FIG. 8B) relative to the opening area A2 of the separator core 8 (FIG. 9A), the centripetal force to counteract the centrifugal force caused by the swirling flow within the dispersion chamber 1 can be controlled to adjust the particle size of the fine particles guided toward the center of the classification chamber 2. Although FIGS. 8A and 8B depict the case in which the fine powder discharge port 15*a* has the same opening area as the fine powder discharge pipe 15*b*, the opening area of the fine powder discharge port 15*a* does not necessarily have to match that of the fine powder discharge pipe 15*b* at the lower end of the discharge pipe 15*b* as long as the upper end of the discharge pipe 15*b* is connected to the fine powder discharge port 15*a*.

$$1/10 \times A2 \leq A1 \leq 8/10 \times A2 \qquad \text{Formula 2}$$

In Formula 2, A2 denotes the opening area of the opening 7 of the separator core 8.

Figure 10:
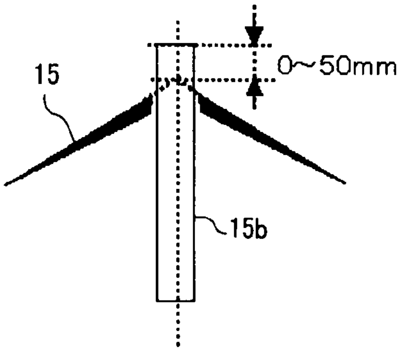
FIG. 10 is an illustrative view showing the manner in which the fine powder discharge pipe of the center core extends upward.

The fine powder discharge pipe 15*b* preferably extends upward from the apex of the center core 15 (FIG. 10). Specifically, the upper end of the fine powder discharge pipe 15*b* may extend from the apex of the center core 15 by a distance up to about 50 mm. This construction allows removal of the coarse powder that contaminates the fine powder guided by the centripetal force generated within the dispersion chamber 1.

The length L of the fine powder discharge pipe 15*b* preferably satisfies Formula 3 given below. The fine powder discharge pipe 15*b* having a length in the specified range and arranged at the center of the center core 15 can effectively transfer the suction force from the opening 7 of the separator core 8 without the suction force being decreased. This construction thus allows the generation of desired centripetal force.

$$2\times D2\leq L\leq 8\times D2 \quad \text{Formula 3}$$

In Formula 3, D2 denotes the diameter of the opening 7 of the separator core 8.

Figure 11A:
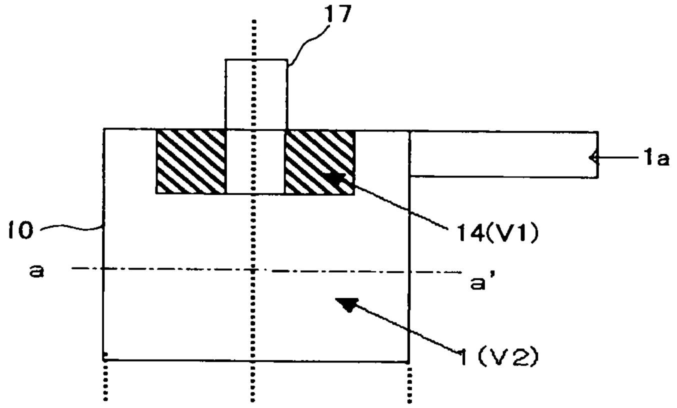
FIG. 11A is an illustrative view of an anti-flow distortion part arranged in the air classifier of the present invention (1/2).
Figure 11B:
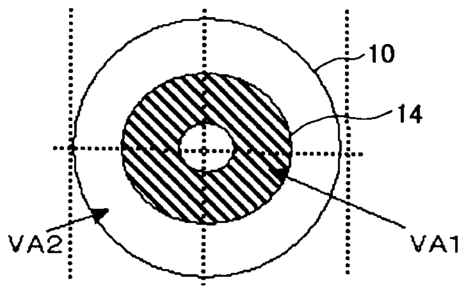
FIG. 11B is an illustrative view of the anti-flow distortion part arranged in the air classifier of the present invention (2/2).

In the air classifier 100, 200, the dispersion chamber 1 preferably accommodates a cylindrical anti-flow distortion part 14 arranged at the center of the upper lid of the casing 10 and on the inner side of the louver ring 1Q. FIGS. 11A and 11B are schematic diagrams showing the discharge chamber 1 containing the anti-flow distortion part 14 (louver ring 1Q is not shown). The anti-flow distortion part 14 is a cylindrical member that is arranged around an exhaust pipe 17 provided through the upper lid of the casing 10 and serves as a hindrance against the powder fluid flowing through the louver ring 1Q into the upper part of the discharge chamber 1. This construction thus prevents the swirling flow of the powder materials from causing stagnation of the powder materials in the upper part of the dispersion chamber 1 and thereby helps achieve undistorted flow of the powder materials.

The anti-flow distortion part 14 preferably has a volume V1 that satisfies Formula 4 given below. The anti-flow distortion part 14 having a volume in the specified range can not only prevent the swirling flow from causing stagnation of the powder materials in the upper part of the dispersion chamber 1, but alto help to achieve undistorted flow of the powder materials according to the particle diameter of the pulverized particles.

$$3/10\times V2\leq V1\leq 8/10\times V2 \quad \text{Formula 4}$$

In Formula 4, V2 denotes the volume of the dispersion chamber 1.

The anti-flow distortion part 14 also preferably has a bottom surface area VA1 that satisfies Formula 5 given below. In other words, the bottom surface area VA1 of the anti-flow distortion part 14 preferably falls in a specified range determined relative to the cross-sectional area VA2 of the casing 10 at the dispersion chamber 1, taken along line a-a' in FIG. 11A (VA2 shown in FIG. 11B). This construction allows the adjustment of the area of the dispersion chamber 1 where the stagnation takes place, so that the swirling flow will not cause the stagnation of the powder materials in the upper part of the dispersion chamber 1 and a desired undistorted flow of the powder materials can be achieved according to the particle diameter of the pulverized particles.

$$2/10\times VA2\leq VA1\leq 7/10\times VA2 \quad \text{Formula 5}$$

In Formula 5, VA2 denotes the cross-sectional area of the casing 10 at the dispersion chamber 1, which is taken along a horizontal direction relative to a cylindrical diameter of the casing 10.

In the air classifier 100, 200, the lower surface (i.e., back surface) of the umbrella-shaped center core 5, 15 are preferably parallel to the upper surface (i.e., front surface). Since the lower surface of the center core 5, 15 having a slope parallel to the upper surface of the center core 5, 15, the tilted angle thereof becomes similar to that of the surface slope of the separator core 8 arranged in the classification 2, and then becomes parallel to the surface slope of the separator core 8. As a result, the flow within the classification chamber 2 is kept undistorted and the accuracy of classification can be improved.

In the air classifier 100, 200, the inner surface of the casing 10 is preferably blast-treated so as to prevent the powder from adhering to the interior of the classifier and maintain stable performance of the classifier.

EXAMPLES

The air classifier of the present invention will now be described with reference to examples.

Example 1

In the classification flow of coarsely pulverized powder shown in FIG. 2, an air classifier having the construction shown in FIGS. 5A and 5B was used as the air classifier BZ1 (the number N of the guide slats 1*q* of the louver ring 1Q=R/30 (where R was the length (in mm) of the inner periphery of the casing of the dispersion chamber)) and an I-type mill pulverizer (manufactured by Nippon Pneumatic Mfg. Co., Ltd.) was used as the first pulverizer FZ1. A mixture of 75% by mass of a polyester resin, 10% by mass of a styrene-acryl copolymer resin and 15% by mass of carbon black was melted and kneaded in a roll mill. The mixture was then allowed to cool and solidified and the solidified mixture was coarsely pulverized in a hammer mill to form a raw toner material. This material was fed at a rate of 100 kg/hr in the classification flow to thereby yield a toner having a particle size distribution such that a weight average particle diameter was 4.5 μm, a fine particle (particle diameter: 5 μm or less) content was 80POP % based on the number average and a coarse particle (particle diameter: 8 μm or greater) content was 1.0% by volume based on the weight average. The particle size of the toner was measured by a MULTISIZER COULTER COUNTER manufactured by Beckman Coulter, Inc.

Comparative Example 1

In the classification flow of coarsely pulverized powder shown in FIG. 2, an air classifier having the construction shown in FIG. 4 was used as the air classifier BZ1 and an I-type mill pulverizer (manufactured by Nippon Pneumatic Mfg. Co., Ltd.) was used as the first pulverizer FZ1. The same kneaded product as that used in Example 1 was fed as raw material at a rate of 80 kg/hr and pulverized to thereby yield a toner having a particle size distribution such that a weight average particle size was 4.9 μm, a fine particle (particle diameter: 5 μm or less) content was 95POP % based on the number average and a coarse particle (particle diameter: 8 μm or greater) content of 2.5% by volume based on the weight average.

Example 2

In this example, the number N of the guide slats 1*q* of the louver ring 1Q of the classifier BZ1 was changed to R/15 (where R was the length (in mm) of the inner periphery of the casing of the dispersion chamber)). Other than that, the same classification flow of coarsely pulverized powder as described in Example 1 was carried out using the same air classifier BZ1 having the construction shown in FIGS. 5A and 5B (but with a different number of the guide slats 1*q*) to pulverize the same raw toner material as that used in Example 1. Feeding the raw material at a rate of 100 kg/hr yielded a toner having a particle size distribution such that a weight average particle size was 4.5 μm, a fine particle (particle diameter: 5 μm or less) content was 75POP % based on the number average and a coarse particle (particle diameter: 8 μm or greater) content of 1.0% by volume based on the weight average.

Example 3

In this example, an air classifier having the construction shown in FIG. 6 was used as the air classifier BZ1 (α1=85°; the opening area A1 of the fine powder discharge port 16*a*=1/12×A2 (where A2 is the opening area of the opening 7 of the separator core 8); the fine powder discharge pipe 15*b* did not extend upward from the apex of the center core 15; the length L of the fine powder discharge pipe 15*b*=1.8×D2 (where D2 is the diameter of the opening 7 of the separator core 8); the anti-flow distortion part 14 not provided). Other than that, the same classification flow of coarsely pulverized powder as described in Example 1 was carried out to pulverize the same raw toner material as that used in Example 1. Feeding the raw material at a rate of 100 kg/hr yielded a toner having a particle size distribution such that a weight average particle size was 4.6 μm, a fine particle (particle diameter: 5 μm or less) content was 82POP % on the number average and a coarse particle (particle diameter: 8 μm or greater) content was 1.1% by volume based on the weight average.

Example 4

In this example, an air classifier having the construction shown in FIG. 6 and in which the center core 15 has an apex angle α1 of 100° was used as the air classifier BZ1. Other than that, the same classification flow of coarsely pulverized powder as described in Example 3 was carried out to pulverize the same raw toner material as that used in Example 1. Feeding the raw material at a rate of 100 kg/hr yielded a toner having a particle size distribution such that a weight average particle size was 4.5 μm, a fine particle (particle diameter: 5 μm or less) content was 78POP % based on the number average and a coarse particle (particle diameter: 8 μm or greater) content was 1.0% by volume based on the weight average.

Example 5

In this example, an air classifier having the construction shown in FIG. 6 and in which the fine powder discharge port 15*a* of the center core 15 has an opening area A1 of 2/10×A2 (where A2 is the opening area of the opening 7 of the separator core 8) was used as the air classifier BZ1. Other than that, the same classification flow of coarsely pulverized powder as described in Example 3 was carried out to pulverize the same raw toner material as that used in Example 1. Feeding the raw material at a rate of 100 kg/hr yielded a toner having a particle size distribution such that a weight average particle size was 4.5 μm, a fine particle (particle diameter: 5 μm or less) content was 75POP % based on the number average and a coarse particle (particle diameter: 8 μm or greater) content was 0.9% by volume based on the weight average.

Example 6

In this example, an air classifier having the construction shown in FIG. 6 and in which the fine powder discharge pipe 15*b* extends upward from the apex of the center core 15 by 15 mm was used as the air classifier BZ1. Other than that, the same classification flow of coarsely pulverized powder as described in Example 3 was carried out to pulverize the same raw toner material as that used in Example 1. Feeding the raw material at a rate of 100 kg/hr yielded a toner having a particle size distribution such that a weight average particle size was 4.5 μm, a fine particle (particle diameter: 5 μm or less) content was 75POP % based on the number average and a coarse particle (particle diameter: 8 μm or greater) content was 0.7% by volume based on the weight average.

Example 7

In this example, an air classifier having the construction shown in FIG. 6 and in which the fine powder discharge pipe 15*b* has a length L of 533 D2 (where D2 is the diameter of the opening 7 of the separator core 8) was used as the air classifier BZ1. Other than that, the same classification flow of coarsely pulverized powder as described in Example 3 was carried out to pulverize the same raw toner material as that used in Example 1. Feeding the raw material at a rate of 103 kg/hr yielded a toner having a particle size distribution such that a weight average particle size was 4.5 μm, a fine particle (particle diameter: 5 μm or less) content was 74POP % based on the number average and a coarse particle (particle diameter: 8 μm or greater) content was 0.7% by volume based on the weight average.

Example 8

In this example, an air classifier having the same construction as shown in FIG. 6 but fitted with an anti-flow distortion part 14 was used as the air classifier BZ1. Other than that, the same classification flow of coarsely pulverized powder as described in Example 3 was carried out to pulverize the same raw toner material as that used in Example 1. Feeding the raw material at a rate of 102 kg/hr yielded a toner having a particle size distribution such that a weight average particle size was 4.5 μm, a fine particle (particle diameter: 5 μm or less) content was 74POP % based on the number average and a coarse particle (particle diameter: 8 μm or greater) content 0.7% by volume based on the weight average.

While the present invention has been described with reference to illustrated embodiments, it should be appreciated that these embodiments are not intended to be exhaustive, and other embodiments, as well as additions, modifications, deletions and other changes to the invention, may also be contemplated as long as such changes are conceivable to those skilled in the art. It is intended that all of these embodiments and changes are within the scope of the invention as long as they can provide the desired effects and advantages of the present invention.

What is claimed is:

1. An air classifier, comprising:

a cylindrical casing provided with a powder material feed port configured to feed high pressure air with a powder material at an upper part of the casing;

a center core arranged in the casing and having an umbrella shape;

a separator core arranged downstream of the center core in the casing and having an umbrella shape, the separator core including an opening formed at a center portion thereof;

a dispersion chamber configured to disperse the powder material fed with the high pressure air, the dispersion chamber being surrounded by an inner wall of the upper part of the casing and the center core and being placed at a same height of the powder material feed port; and a classification chamber configured to classify the powder material flowing in from the dispersion chamber into a fine powder and a coarse powder by centrifugation, the classification chamber being surrounded by the center core, the separator core and the inner wall of the casing, wherein the dispersion chamber includes a louver ring having a plurality of guide slats circularly arranged at regular intervals, wherein the dispersion chamber includes a space which encircles the louver ring and serves as a flow passage of the high pressure air and powder material fed from the powder material feed port, wherein the louver ring is upstream of the center core, and wherein the center core includes a fine powder discharge pipe that extends through the center core and above a highest apex of the center core, the center core having the umbrella shape and being arranged upstream of the separator core having the umbrella shape.

2. The air classifier according to claim 1, wherein the center core includes a fine powder discharge port formed at a center thereof and the fine powder discharge pipe connected to the fine powder discharge port and extending from the fine powder discharge port to the opening of the separator core.

3. The air classifier according to claim 2, wherein the highest apex of the center core has an apex angle $\alpha 1$ of 90° to 140°.

4. The air classifier according to claim 2, wherein the fine powder discharge port of the center core has an opening area A1, and the opening area A1 satisfies Formula 2:

$$1/10 \times A2 \leq A1 < 8/10 \times A2$$

where A2 is an opening area of the opening of the separator core.

5. The air classifier according to claim 2, wherein the fine powder discharge pipe has a length L which satisfies Formula 3:

$$2 \times D2 \leq L \leq 8 \times D2$$

where D2 is a diameter of the opening of the separator core.

6. The air classifier according to claim 1, wherein the dispersion chamber comprises a cylindrical anti-flow distortion part arranged at a center of an upper lid of the casing.

7. The air classifier according to claim 6, wherein the anti-flow distortion part has a volume V1 which satisfies Formula 4:

$$3/10 \times V2 \leq V1 \leq 8/10 \times V2$$

wherein V2 is a volume of the dispersion chamber.

8. The air classifier according to claim 6, wherein the anti-flow distortion part has a bottom surface area VA1 which satisfies Formula 5:

$$2/10 \times VA2 \leq VA1 \leq 7/10 \times VA2$$

wherein VA2 is a cross-sectional area of the casing at the dispersion chamber, which is taken along a horizontal direction relative to a cylindrical diameter of the casing.

9. The air classifier according to claim 1, wherein the center core includes a lower surface arranged parallel to an upper surface thereof.

10. The air classifier according to claim 1, wherein the casing includes a blast-treated inner surface.

11. The air classifier according to claim 1, wherein the space of the dispersion chamber encircles an outside of the louver ring.

12. The air classifier according to claim 1, wherein the louver ring is arranged at the same height with the powder material feed port.

13. The air classifier according to claim 1, wherein the center core is arranged directly below the powder material feed port.

14. The air classifier according to claim 1, wherein the fine powder discharge pipe extends above the highest apex of the center core such that a distance between the fine powder discharge pipe and the powder material feed port is smaller than a distance between the highest apex of the center core and the powder material feed port.

15. The air classifier according to claim 1, wherein the fine powder discharge pipe extends downward from the center core into an opening of the separator core and into a pipe, and the pipe extends downward from the separator core, without extending upward into the center core.

16. The air classifier according to claim 1, wherein the fine powder discharge pipe extends through the highest apex of the center core.

* * * * *